(12) United States Patent
Zhao et al.

(10) Patent No.: US 10,327,229 B2
(45) Date of Patent: Jun. 18, 2019

(54) DATA RECEPTION METHOD, DATA TRANSMISSION METHOD AND DATA RECEPTION DEVICE FOR DEVICE-TO-DEVICE COMMUNICATION

(71) Applicant: CHINA ACADEMY OF TELECOMMUNICATIONS TECHNOLOGY, Beijing (CN)

(72) Inventors: Rui Zhao, Beijing (CN); Qiubin Gao, Beijing (CN); Wenhong Chen, Beijing (CN); Ying Peng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/327,617

(22) PCT Filed: Aug. 5, 2015

(86) PCT No.: PCT/CN2015/086113
§ 371 (c)(1),
(2) Date: Jan. 19, 2017

(87) PCT Pub. No.: WO2016/019864
PCT Pub. Date: Feb. 11, 2016

(65) Prior Publication Data
US 2017/0156134 A1    Jun. 1, 2017

(30) Foreign Application Priority Data
Aug. 7, 2014 (CN) .......................... 2014 1 0386994

(51) Int. Cl.
*H04W 72/04* (2009.01)
*H04L 5/00* (2006.01)
*H04W 76/14* (2018.01)

(52) U.S. Cl.
CPC ....... *H04W 72/0406* (2013.01); *H04L 5/0053* (2013.01); *H04L 5/0051* (2013.01); *H04W 72/044* (2013.01); *H04W 76/14* (2018.02)

(58) Field of Classification Search
None
See application file for complete search history.

(56) References Cited

U.S. PATENT DOCUMENTS 9,198,162 B2 * 11/2015 Van Phan ............. H04W 72/04
9,826,522 B2 * 11/2017 Chen ................... H04W 72/044
(Continued)

FOREIGN PATENT DOCUMENTS

| CN | 102461297 A | 5/2012 |
| CN | 103841649 A | 6/2014 |
| WO | 2011124015 A1 | 10/2011 |

OTHER PUBLICATIONS

International Search Report for PCT/CN2015/086113 dated Sep. 30, 2015 and its English translation provided by WIPO.
(Continued)

*Primary Examiner* — Candal Elpenord
(74) *Attorney, Agent, or Firm* — Ladas & Parry, LLP

(57) ABSTRACT

The present disclosure provides a data reception method, a data transmission method, a data reception device and a data transmission device for device-to-device (D2D) communication, so as to enable a UE to receive data from a transmitting UE in the case that the UE does not know resource pool configuration information of the transmitting UE. The data reception method includes steps of: detecting control information from a transmitter using each set of locally-stored resource pool configuration information; determining resource pool configuration information used by the transmitter in accordance with the detected control information; and receiving data information from the transmitter in
(Continued)

accordance with the determined resource pool configuration information and the control information.

17 Claims, 6 Drawing Sheets

(56) References Cited

U.S. PATENT DOCUMENTS

| | | | |
|---|---|---|---|
| 2012/0250636 | A1 | 10/2012 | Wang et al. |
| 2016/0021483 | A1* | 1/2016 | Wei .................... H04W 4/70 455/41.2 |
| 2016/0205678 | A1* | 7/2016 | Fujishiro ............ H04W 72/048 370/254 |
| 2017/0079026 | A1* | 3/2017 | Li ...................... H04W 72/04 |
| 2017/0195995 | A1* | 7/2017 | Zhu .................... H04W 72/04 |
| 2017/0223711 | A1* | 8/2017 | Wang .................. H04W 72/02 |

OTHER PUBLICATIONS

Written Opinion of the International Search Authority for PCT/CN2015/086113 dated Sep. 30, 2015 and its English translation provided by WIPO.
International Preliminary Report on Patentability (IPRP; Ch 1) for PCT/CN2015/086113 dated Feb. 16, 2017 and its English translation provided by WIPO.
From EP Application No. 15829153.4, Supplementary European Search Report and Search Opinion dated Jul. 17, 2017.
R1-140825—LG Electronics, "On the Resource Pool Configuration for D2D Communications" 3GPP TSG RAN WG1 Meeting #76; Prague, Czech Republic, Feb. 10-14, 2014; pp. 1-13.
R1-142401—Ericsson, "D2D Broadcast Control Information and Related Procedures"; 3GPP TSG RAN WG1 Meeting #77; Seoul, Korea, May 19-23, 2014; pp. 106.
R2-141609—General Dynamics, "Resource Pool Configuration for D2D Communication"; 3GPP TSG-RAN2#85bis; Valencia, Spain, Mar. 31-Apr. 4, 2014; pp. 1-8.
R2-142696—Institute for Information Industry (III), "Mode switching for ProSe communication"; 3GPP TSG-RAN WG2 Meeting #86; Seoul, Republic of Korea, May 19-23, 2014; pp. 1-4.
From JP Application No. 2017-504708, Office Action dated Feb. 13, 2018 with English translation from Global Dossier.
Qualcomm Incorporated, "eNB resource allocation for D2D broadcast communication"; 3GPP TSG-RAN WG2 #85 Bis; R2-141685; Valencia, Spain; Mar. 31-Apr. 4, 2014; pp. 1-6.
Ericsson, "Configuration of resource pools for various coverage scenarios"; 3GPP TSG-RAN WG2 #85; R2-140622; Prague, Czech Republic, Feb. 10-14, 2014; pp. 1-4.
From KR Application No. 10-2017-7002181, Office Action dated Jul. 27, 2018 with machine English translation from KIPO.
R1-141229—Fujitsu, "Further analysis on control signal and Scheduling Assignment for D2D communication"; 3GPP TSG-RAN1 #76bis; Shenzhen, China, Mar. 31-Apr. 4, 2014; pp. 1-7.
R1-141380—Ericsson, "Synchronization Signals and Channel Design for D2D Discovery and Communication"; 3GPP TSG RAN WG1 Meeting #76bis; Shenzhen, China; Mar. 31-Apr. 4, 2014; pp. 1-9.
From JP 2017504708, Notification of Reasons for Refusal, dated Dec. 12, 2018, with machine English translation from JPO.
ZTE, "SA and Data Resource Allocation for Mode 1"; 3GPP TSG-RAN WG1 Meeting #77, Seoul, South Korea; May 19-23, 2014; R1-142232; pp. 2-6.
Ericsson, "Overview of D2D Functions Needing Standardization"; 3GPP TSG-RAN WG2 Meeting #85; Prague, Czech Republic; Feb. 10-14, 2014; R2-140797; pp. 2-8.
InterDigital Communications, "Mode Selection and Resource Pool Selection for D2D UEs", 3GPP TSG-RAN WG2 Meeting #85bis; Valencia, Spain; Mar. 31-Apr. 4, 2014; R2-141695; pp. 2-6.
ZTE, "On Efficient SA Resource Monitoring"; 3GPP TSG-RAN2 Meeting #86; Seoul, South Korea; May 19-23, 2014; R2-142148; pp. 2-5.

\* cited by examiner

DATA RECEPTION METHOD, DATA TRANSMISSION METHOD AND DATA RECEPTION DEVICE FOR DEVICE-TO-DEVICE COMMUNICATION

CROSS REFERENCE TO RELATED APPLICATIONS

The present application is the U.S. national phase of PCT Application No. PCT/CN2015/086113 filed on Aug. 5, 2015, which claims a priority of to the Chinese patent application No. 201410386994.5 filed on Aug. 7, 2014, the disclosures of which are incorporated herein by reference in their entireties.

TECHNICAL FIELD

The present disclosure relates to the field of communication technology, in particular to a data reception method, a data transmission method and a data reception device for device-to-device (D2D) communication.

BACKGROUND

For a traditional cellular communication technology, its data communication procedure between two User Equipments (UEs) is shown in FIG. 1, where services such as voice and data services are interacted between the two UEs through base stations (common base stations or evolved Nodes B (eNBs)) where the two UEs reside respectively as well a core network.

D2D communication technology, i.e., direct communication technology between the UEs, refers to a technology where data is transmitted between the adjacent UEs within a short range through a direct link, rather than being forwarded by a central node (e.g., a base station), as shown in FIG. 2.

There exist the following advantages for the D2D communication.

1. Through the short-range, direct communication mode between the UEs, it is able to acquire a high data transmission rate, a low time delay and low power consumption. 2. By use of the communication terminals widely distributed in a network and a short-range characteristic of a D2D communication link, it is able to improve the utilization of spectrum resources efficiently. 3. It is able for the D2D communication mode to meet the local data sharing requirement for services such as peer-to-peer (P2P) services, thereby to provide the data services in a flexible manner. 4. It is able for the D2D communication mode to utilize a large quantity of the communication terminals widely distributed in the network, thereby to expand the network coverage.

As shown in FIGS. 3a, 3b, 3c and 3d, there mainly exist four application scenarios for the D2D communication, and these application scenarios may also be combined in any way. For the D2D communication, a UE1 and a UE2 may be located within or outside the network coverage, and one of them may be taken as a transmitter or a reception UE relative to the other. In the scenario as shown in FIG. 3a, the UE1 and UE2 are both located outside the network coverage; in the scenario as shown in FIG. 3b, the UE1 is located within the network coverage, while the UE2 is located outside the network coverage; in the scenario as shown in FIG. 3c, the UE1 and UE2 are located within the coverage area of an identical base station; and in the scenario as shown in FIG. 3d, the UE1 and UE2 are located within the coverage area of different base stations.

Apart from the one-to-one communication mode between the UEs, the D2D communication may typically include D2D multicast or broadcast communication, which may be used for public security applications, such as fire-fighting, rescue and anti-terrorist operations.

In the related art, the UEs within the network coverage may transmit and receive data in accordance with resource pool configuration information configured by the network, and the UEs outside the network coverage may transmit and receive data in accordance with predetermined resource pool configuration information. In the case that the D2D communication is applied to a scenario where merely one of the UEs is located within the network coverage or a scenario where the UEs are located within the coverage area of different cells, there is no scheme about how one of the UEs can receive the data from a transmitting UE when it does not know the resource pool configuration information of the transmitting UE.

SUMMARY

An object of the present disclosure is to provide a data reception method, a data transmission method; and a data reception device for D2D communication, so as to enable a UE to receive data from a transmitting UE in the case that the UE does not know resource pool configuration information of the transmitting UE.

In one aspect, the present disclosure provides in some embodiments a data reception method for D2D communication, including steps of: detecting control information from a transmitter using each set of locally-stored resource pool configuration information; determining resource pool configuration information used by the transmitter in accordance with the detected control information; and receiving data information from the transmitter in accordance with the determined resource pool configuration information and the control information.

In a possible embodiment of the present disclosure, the step of determining the resource pool configuration information used by the transmitter in accordance with the detected control information includes: acquiring identification information carried in the control information at a specific bit, and determining resource pool configuration information corresponding to the identification information as the resource pool configuration information used by the transmitter; or acquiring identification information carried in a Demodulation Reference Signal (DMRS) sequence for transmitting the control information, and determining resource pool configuration information corresponding to the identification information as the resource pool configuration information used by the transmitter; or acquiring a position of a transmission resource of the control information, and determining, in accordance with a predetermined correspondence between the position of the transmission resource and resource pool configuration information, resource pool configuration information corresponding to the position of the transmission resource as the resource pool configuration information used by the transmitter.

In a possible embodiment of the present disclosure, in the case that the resource pool configuration information is derived from a UE within the coverage area of a cell or network, the identification information is an identifier associated with a cell identifier, and in the case that the resource pool configuration information is derived from a UE outside the coverage area of the network, the identification information is a predetermined value.

In a possible embodiment of the present disclosure, depending on its sources, the locally-stored resource pool configuration information includes any one or more of pre-configured resource pool configuration information, resource pool configuration information indicated by a base station, and resource pool configuration information indicated by any other UE.

In a possible embodiment of the present disclosure, the resource pool configuration information includes time-frequency resource indication information, and/or frequency-hopping indication information, and/or Cyclic Prefix (CP) length indication information.

In a possible embodiment of the present disclosure, the resource pool configuration information consists of control resource pool configuration information for the control information and data resource pool configuration information for the data information. The frequency-hopping indication information includes frequency-hopping indication information located in the control resource pool configuration information and used for the transmission of the control information, and frequency-hopping indication information located in the data resource pool configuration information and used for the transmission of the data information. The time-frequency resource indication information includes time-frequency resource indication information located in the control resource pool configuration information and used for the transmission of the control information, and time-frequency resource indication information located in the data resource pool configuration information and used for the transmission of the data information. The CP length indication information includes CP length indication information located in the control resource pool configuration information and used for the transmission of the control information, and CP length indication information located in the data resource pool configuration information and used for the transmission of the data information.

In another aspect, the present disclosure provides in some embodiments a data transmission method for D2D communication, including steps of: determining resource pool configuration information from at least one set of resource pool configuration information; generating control information in accordance with the determined resource pool configuration information; and transmitting the control information in accordance with the determined resource pool configuration information, and transmitting data information in accordance with the control information.

In a possible embodiment of the present disclosure, depending on its resource, the at least one set of resource pool configuration information includes any one or more of pre-configured resource pool configuration information, resource pool configuration information indicated by a base station, and resource pool configuration information indicated by any other UE.

In a possible embodiment of the present disclosure, the step of determining the resource pool configuration information from the at least one set of resource pool configuration information includes: in the case that a UE is located outside the coverage area of a network, determining the pre-configured resource pool configuration information as the resource pool configuration information; and in the case that the UE is located within the coverage area of the network, determining the resource pool configuration information indicated by the base station as the resource pool configuration information, or determining any one of sets of the resource pool configuration information forwarded by the other UEs as the resource pool configuration information.

In a possible embodiment of the present disclosure, the step of generating the control information in accordance with the determined resource pool configuration information includes: acquiring predetermined identification information corresponding to the determined resource pool configuration information, the identification information being carried in the control information at a specific bit; or acquiring predetermined identification information corresponding to the determined resource pool configuration information, the identification information being carried in a DMRS sequence adopted for transmitting the control information.

In a possible embodiment of the present disclosure, in the case that the resource pool configuration information is derived from a UE within the coverage area of a cell or network, the identification information is an identifier associated with a cell identifier, and in the case that the resource pool configuration information is derived from a UE outside the coverage area of the network, the identification information is a predetermined value.

In a possible embodiment of the present disclosure, the resource pool configuration information includes time-frequency resource indication information, and/or frequency-hopping indication information, and/or CP length indication information.

In a possible embodiment of the present disclosure, the resource pool configuration information consists of control resource pool configuration information for the control information and data resource pool configuration information for the data information. The frequency-hopping indication information includes frequency-hopping indication information located in the control resource pool configuration information and used for the transmission of the control information, and frequency-hopping indication information located in the data resource pool configuration information and used for the transmission of the data information. The time-frequency resource indication information includes time-frequency resource indication information located in the control resource pool configuration information and used for the transmission of the control information, and time-frequency resource indication information located in the data resource pool configuration information and used for the transmission of the data information. The CP length indication information includes CP length indication information located in the control resource pool configuration information and used for the transmission of the control information, and CP length indication information located in the data resource pool configuration information and used for the transmission of the data information.

In a third aspect, the present disclosure provides in some embodiments a UE for D2D communication, including: a detection unit configured to detect control information from a transmitter using each set of locally-stored resource pool configuration information; a determination unit configured to determine resource pool configuration information used by the transmitter in accordance with the detected control information; and a reception unit configured to receive data information from the transmitter in accordance with the determined resource pool configuration information and the detected control information.

In a possible embodiment of the present disclosure, the determination unit is further configured to: acquire identification information carried in the control information at a specific bit, and determine resource pool configuration information corresponding to the identification information as the resource pool configuration information used by the transmitter; or acquire identification information carried in a DMRS sequence for transmitting the control information, and determine resource pool configuration information corresponding to the identification information as the resource pool configuration information used by the transmitter; or acquire a position of a transmission resource of the control information, and determine, in accordance with a predetermined correspondence between the position of the transmission resource and resource pool configuration information, resource pool configuration information corresponding to the position of the transmission resource as the resource pool configuration information used by the transmitter.

In a possible embodiment of the present disclosure, in the case that the resource pool configuration information is derived from a UE within the coverage area of a cell or network, the identification information is an identifier associated with a cell identifier, and in the case that the resource pool configuration information is derived from a UE outside the coverage area of the network, the identification information is a predetermined value.

In a possible embodiment of the present disclosure, depending on its sources, the locally-stored resource pool configuration information includes any one or more of pre-configured resource pool configuration information, resource pool configuration information indicated by a base station, and resource pool configuration information indicated by any other UE.

In a possible embodiment of the present disclosure, the resource pool configuration information includes time-frequency resource indication information, and/or frequency-hopping indication information, and/or Cyclic Prefix (CP) length indication information.

In a possible embodiment of the present disclosure, the resource pool configuration information consists of control resource pool configuration information for the control information and data resource pool configuration information for the data information. The frequency-hopping indication information includes frequency-hopping indication information located in the control resource pool configuration information and used for the transmission of the control information, and frequency-hopping indication information located in the data resource pool configuration information and used for the transmission of the data information. The time-frequency resource indication information includes time-frequency resource indication information located in the control resource pool configuration information and used for the transmission of the control information, and time-frequency resource indication information located in the data resource pool configuration information and used for the transmission of the data information. The CP length indication information includes CP length indication information located in the control resource pool configuration information and used for the transmission of the control information, and CP length indication information located in the data resource pool configuration information and used for the transmission of the data information.

In still yet another aspect, the present disclosure provides in some embodiments a UE for D2D communication, including: a determination unit configured to determine resource pool configuration information from at least one set of resource pool configuration information; a generation unit configured to generate control information in accordance with the determined resource pool configuration information; and a transmission unit configured to transmit the generated control information in accordance with the determined resource pool configuration information, and transmit data information in accordance with the control information.

In a possible embodiment of the present disclosure, depending on its resource, the at least one set of resource pool configuration information includes any one or more of pre-configured resource pool configuration information, resource pool configuration information indicated by a base station, and resource pool configuration information indicated by any other UE.

In a possible embodiment of the present disclosure, the determination unit is further configured to: in the case that a UE is located outside the coverage area of a network, determine the pre-configured resource pool configuration information as the resource pool configuration information; and in the case that the UE is located within the coverage area of the network, determine the resource pool configuration information indicated by the base station as the resource pool configuration information, or determine any one of sets of the resource pool configuration information forwarded by the other UEs as the resource pool configuration information.

In a possible embodiment of the present disclosure, the generation unit is further configured to: acquire predetermined identification information corresponding to the determined resource pool configuration information, the identification information being carried in the control information at a specific bit; or acquire predetermined identification information corresponding to the determined resource pool configuration information, the identification information being carried in a DMRS sequence adopted for transmitting the control information.

In a possible embodiment of the present disclosure, in the case that the resource pool configuration information is derived from a UE within the coverage area of a cell or network, the identification information is an identifier associated with a cell identifier, and in the case that the resource pool configuration information is derived from a UE outside the coverage area of the network, the identification information is a predetermined value.

In a possible embodiment of the present disclosure, the resource pool configuration information includes time-frequency resource indication information, and/or frequency-hopping indication information, and/or CP length indication information.

In a possible embodiment of the present disclosure, the resource pool configuration information consists of control resource pool configuration information for the control information and data resource pool configuration information for the data information. The frequency-hopping indication information includes frequency-hopping indication information located in the control resource pool configuration information and used for the transmission of the control information, and frequency-hopping indication information located in the data resource pool configuration information and used for the transmission of the data information. The time-frequency resource indication information includes time-frequency resource indication information located in the control resource pool configuration information and used for the transmission of the control information, and time-frequency resource indication information located in the data resource pool configuration information and used for the transmission of the data information. The CP length indication information includes CP length indication information located in the control resource pool configuration information and used for the transmission of the control information, and CP length indication information located in the data resource pool configuration information and used for the transmission of the data information.

According to the embodiments of the present disclosure, it is able for the reception UE to detect the control information transmitted from the transmitter by using each set of the locally-stored resource pool configuration information, and determine the resource pool configuration information adopted by the transmitter according to the detected control information, so as to receive the data information from the transmitter in accordance with the determined resource pool configuration information and the control information.

In still yet another aspect, the present disclosure provides in some embodiments a UE for D2D communication, including: a processor; and a memory connected to the processor via a bus interface and configured to store therein programs and data used for the operation of the processor. In the case that the programs and data stored in the memory are called and executed by the processor, the processor is configured to achieve the functions of: a detection unit configured to detect control information from a transmitter using each set of locally-stored resource pool configuration information; a determination unit configured to determine resource pool configuration information used by the transmitter in accordance with the detected control information; and a reception unit configured to receive data information from the transmitter in accordance with the determined resource pool configuration information and the detected control information.

In still yet another aspect, the present disclosure provides in some embodiments a UE for D2D communication, including: a processor; and a memory connected to the processor via a bus interface and configured to store therein programs and data used for the operation of the processor. In the case that the programs and data stored in the memory is called and executed by the processor, the processor is configured to achieve the functions of: a determination unit configured to determine resource pool configuration information from at least one set of resource pool configuration information; a generation unit configured to generate control information in accordance with the determined resource pool configuration information; and a transmission unit configured to transmit the generated control information in accordance with the determined resource pool configuration information, and transmit data information in accordance with the control information.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
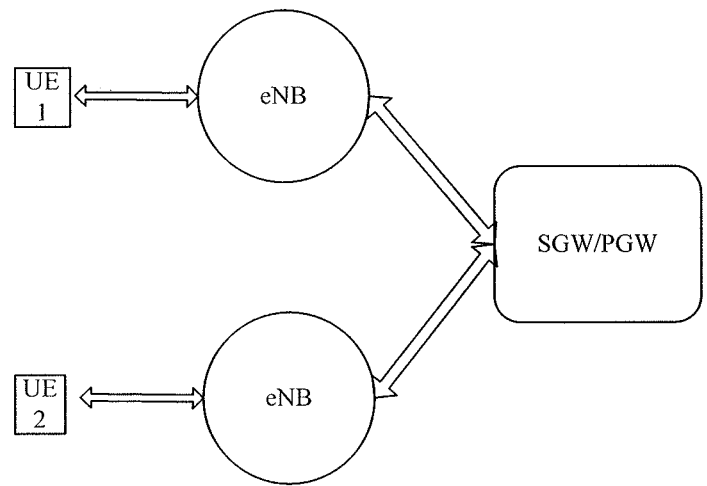
FIG. 1 is a schematic view showing an existing cellular communication system.
Figure 2:
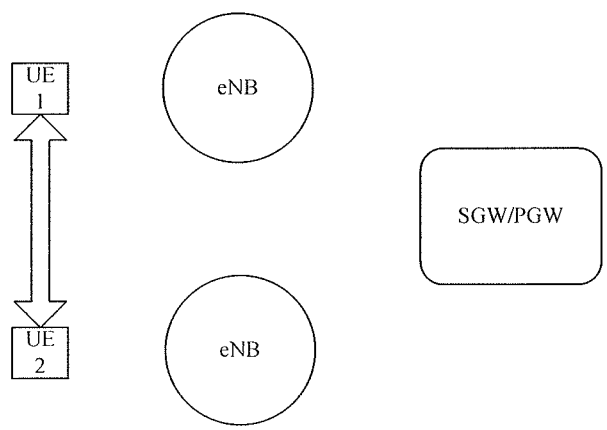
FIG. 2 is a schematic view showing an existing D2D communication system.
Figure 3A:
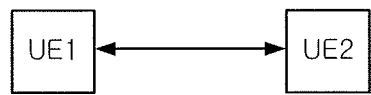
FIG. 3a is a schematic view showing an application scenario of the existing D2D communication system.
Figure 3B:
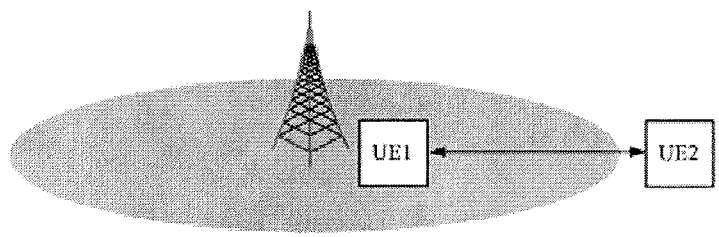
FIG. 3b is a schematic view showing another application scenario of the existing D2D communication system.
Figure 3C:
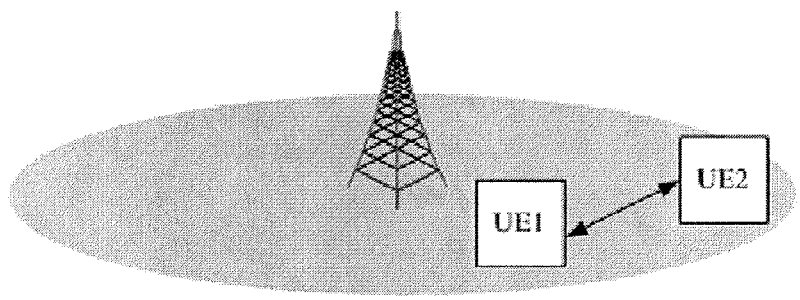
FIG. 3c is a schematic view showing yet another application scenario of the existing D2D communication system.
Figure 3D:
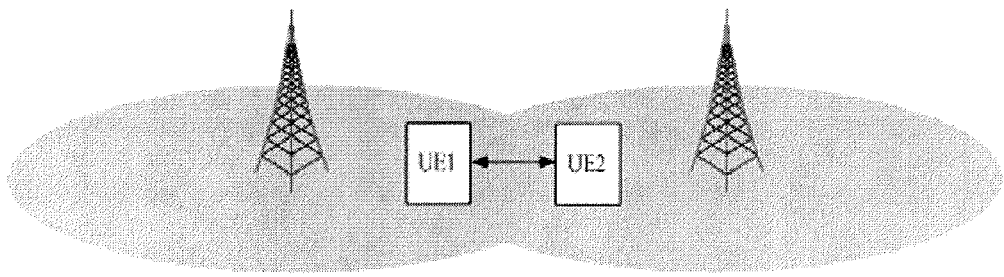
FIG. 3d is a schematic view showing still yet another application scenario of the existing D2D communication system.
Figure 4:
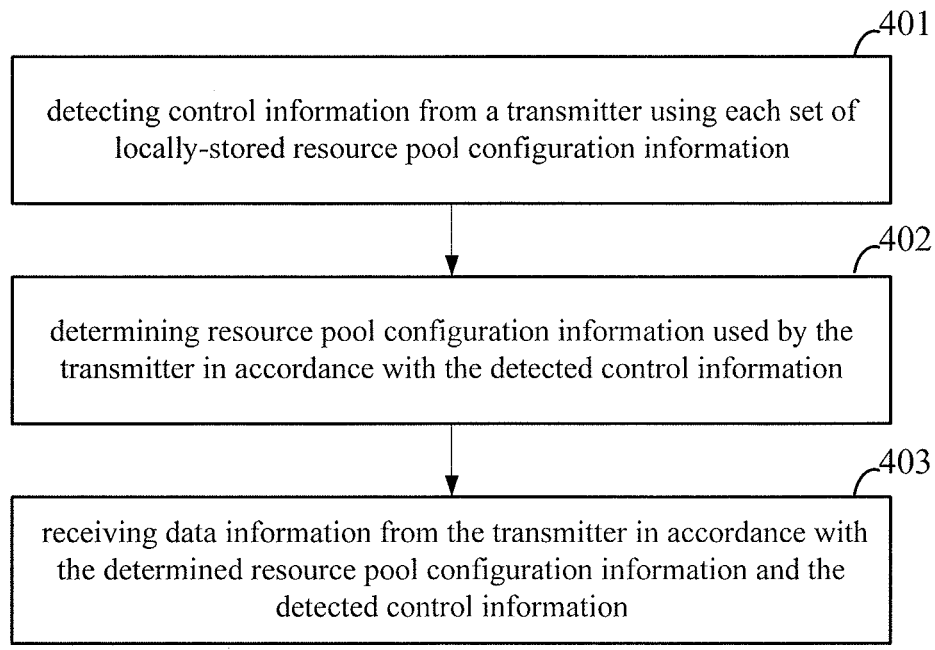
FIG. 4 is a flow chart of a data reception method according to one embodiment of the present disclosure.

As shown in FIG. 4, the present disclosure provides in some embodiments a data reception method for D2D communication of a reception UE, which includes the following steps.

Step 401: detecting, by the reception UE, control information from a transmitter using each set of locally-stored resource pool configuration information.

In the embodiments of the present disclosure, the reception UE may perform blind detection on the control information in accordance with resources configured in the resource pool configuration information and capable of being used for the transmission of the control information. This process is similar to the blind detection of a Physical Downlink Control Channel (PDCCH).

In a possible embodiment of the present disclosure, the blind detection may be performed on all the resources configured in the resource pool configuration information, and in another possible embodiment of the present disclosure, the detection may be performed on the control information on a part of the resources configured in the resource pool configuration information in accordance with a pre-defined rule.

In a possible embodiment of the present disclosure, the UE may update the locally-stored resource pool configuration information in accordance with a predetermined time period, and in the case that the UE fails to receive a certain set of resource pool configuration information within the predetermined time period, it may delete it from a list of the locally-stored resource pool configuration information.

In a possible embodiment of the present disclosure, depending on its sources, the resource pool configuration information locally stored at the reception UE may include any one or more of pre-configured resource pool configuration information, resource pool configuration information indicated by a base station, and resource pool configuration information indicated by any other UE.

To be specific, the resource pool configuration information indicated by different base stations may be different from each other. There may be one or a plurality of sets of resource pool configuration information indicated by any other UE.

To be specific, in the case that the UE is located outside the coverage area of the network, the UE may be configured with the resource pool configuration information in advance. In the case that the UE is located within the coverage area of the base station, the UE may receive the resource pool configuration information indicated by the base station, or receive the resource pool configuration information indicated by the base station and forwarded by the other UE. No matter whether the UE is located within the coverage area of the network, the UE may receive one or a plurality of sets of resource pool configuration information forwarded by the other UE, and the resource pool configuration information forwarded by the other UE may be the resource pool configuration information indicated by the base station to which the UE belongs.

In a possible embodiment of the present disclosure, the resource pool configuration information may include, but not limited to, time-frequency resource indication information, and/or frequency-hopping indication information, and/or CP length indication information.

In a possible embodiment of the present disclosure, the resource pool configuration information consists of control resource pool configuration information for control information and data resource pool configuration information for data information.

In the case that a frequency-hopping mode for the transmission of the control information is different from that for the transmission of the data information, the frequency-hopping indication information may include frequency-hopping indication information for the transmission of the control information and frequency-hopping indication information for the transmission of the data information. The frequency-hopping indication information for the transmission of the control information is located in the control resource pool configuration information, and the frequency-hopping indication information for the transmission of the data information is located in the data resource pool configuration information. In the case that the frequency-hopping mode for the transmission of the control information is identical to that for the transmission of the data information, it is unnecessary to separately indicate the frequency-hopping indication information for the transmission of the control information and the frequency-hopping indication information for the transmission of the data information.

Identically, in the case that the time-frequency resource for the transmission of the control information is different from that for the transmission of the data information, the time-frequency resource indication information may include time-frequency resource indication information located in the control resource pool configuration information and used for the transmission of the control information, and time-frequency resource indication information located in the data resource pool configuration information and used for the transmission of the data information. In the case that a CP length for the transmission of the control information is different from that for the transmission of the data information, the CP length indication information may include CP length indication information located in the control resource pool configuration information and used for the transmission of the control information, and CP length indication information located in the data resource pool configuration information and used for the transmission of the data information.

The time-frequency resource indication information may include, but not limited to, indication information about a D2D transmission subframe and/or indication information about a position of a frequency resource.

Step 402: determining, by the reception UE, resource pool configuration information used by the transmitter in accordance with the detected control information.

In a possible embodiment of the present disclosure, the UE may determine, in accordance with the detected control information, the resource pool configuration information used by the transmitter in, but not limited to, following ways.

In a first way, the UE may acquire identification information carried in the detected control information at a specific bit, and determine resource pool configuration information corresponding to the identification information as the resource pool configuration information used by the transmitter.

In a second way, the UE may acquire identification information carried in a DMRS sequence for transmitting the detected control information, and determine resource pool configuration information corresponding to the identification information as the resource pool configuration information used by the transmitter.

In a third way, the UE may obtain a position of a transmission resource of the detected control information, and determine, in accordance with a predetermined correspondence between the position of the transmission resource and resource pool configuration information, resource pool configuration information corresponding to the position of the transmission resource as the resource pool configuration information used by the transmitter.

To be specific, in the third way, the UE may acquire a retransmission mode of the detected control information, and determine, in accordance with a predetermined correspondence between the retransmission mode and resource pool configuration information, the resource pool configuration information corresponding to the retransmission mode as the resource pool configuration information used by the transmitter.

In a possible embodiment of the present disclosure, in the first or the second way, in the case that the resource pool configuration information is derived from the UE within the coverage area of a cell or network, the identification information is an identifier associated with a cell identifier, and in the case that the resource pool configuration information is derived from the UE outside the coverage area of the network, the identification information is a predetermined value.

The identifier associated with the cell identifier may be just the cell identifier, or identification information calculated in accordance with the cell identifier using a predetermined rule.

Step 403: receiving, by the reception UE, the data information from the transmitter in accordance with the determined resource pool configuration information and the detected control information.

The reception UE may determine a resource occupied by the data information from the transmitter in accordance with the determined resource pool configuration information, and receive the data information from the transmitter on the determined resource in accordance with the control information.

According to the embodiments of the present disclosure, the reception UE may detect the control information from the transmitter in accordance with each set of the locally-stored resource pool configuration information, and determine the resource pool configuration information used by the transmitter in accordance with the detected control information. As a result, it is able for the reception UE to receive the data information from the transmitter in accordance with the determined resource pool configuration information and the detected control information.

Figure 5:
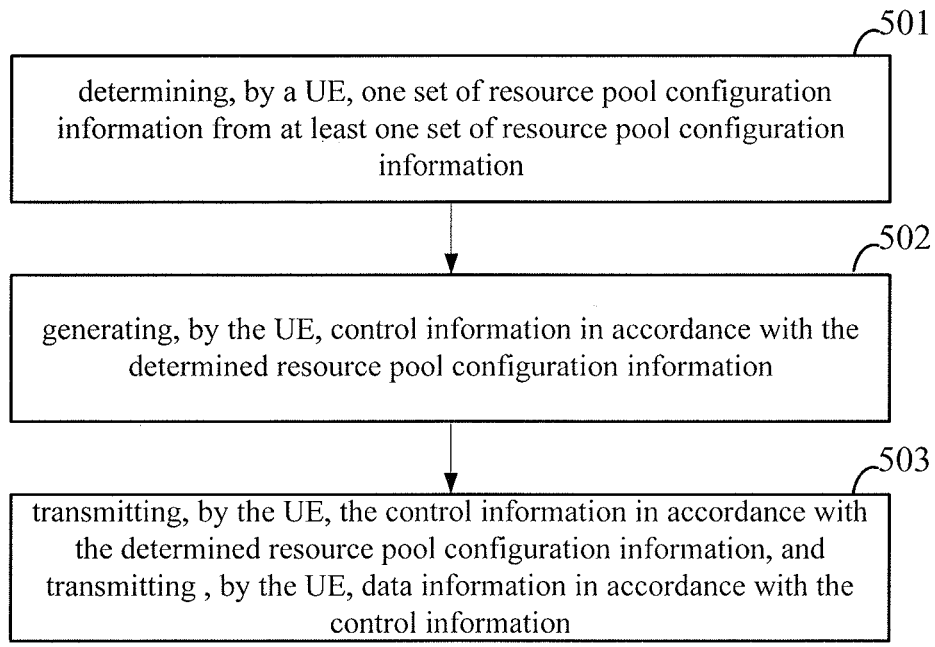
FIG. 5 is a flow chart of a data transmission method according to one embodiment of the present disclosure.

Based on an identical inventive concept, as shown in FIG. 5, the present disclosure provides in some embodiments a data transmission method for D2D communication of the transmission UE, which may include the following steps.

Step 501: determining, by a UE, a set of resource pool configuration information from at least one set of resource pool configuration information.

In a possible embodiment, depending on its sources, the at least one set of resource pool configuration information may include any one or more of pre-configured resource pool configuration information, resource pool configuration information indicated by a base station, and resource pool configuration information indicated by any other UE.

In a possible embodiment of the present disclosure, the step of determining the resource pool configuration information from the at least one set of resource pool configuration information may include: in the case that the UE is located outside the coverage area of a network, determining the pre-configured resource pool configuration information as the resource pool configuration information; and in the case that the UE is located within the coverage area of the network, determining the resource pool configuration information indicated by the base station as the resource pool configuration information, or determining any one of sets of the resource pool configuration information forwarded by the other UEs as the resource pool configuration information.

To be specific, the resource pool configuration information indicated by different base stations may be different from each other, and correspondingly, the sets of resource pool configuration information, which are configured by the base stations to which the UEs belong and forwarded by the UEs within the coverage areas of different base stations, may be different from each other.

In a possible embodiment of the present disclosure, any one set of resource pool configuration information may include, but not limited to, time-frequency resource indication information, and/or frequency-hopping indication information, and/or CP length indication information.

In a possible embodiment of the present disclosure, the resource pool configuration information consists of control resource pool configuration information for the control information and data resource pool configuration information for the data information.

In the case that a frequency-hopping mode for the transmission of the control information is different from that for the transmission of the data information, the frequency-hopping indication information may include frequency-hopping indication information for the transmission of the control information and frequency-hopping indication information for the transmission of the data information. The frequency-hopping indication information for the transmission of the control information is located in the control resource pool configuration information, and the frequency-hopping indication information for the transmission of the data information is located in the data resource pool configuration information. In the case that the frequency-hopping mode for the transmission of the control information is identical to that for the transmission of the data information, it is unnecessary to separately indicate the frequency-hopping indication information for the transmission of the control information and the frequency-hopping indication information for the transmission of the data information.

Identically, in the case that the time-frequency resource for the transmission of the control information is different from that for the transmission of the data information, the time-frequency resource indication information may include time-frequency resource indication information located in the control resource pool configuration information and used for the transmission of the control information, and time-frequency resource indication information located in the data resource pool configuration information and used for the transmission of the data information. In the case that a CP length for the transmission of the control information is different from that for the transmission of the data information, the CP length indication information may include CP length indication information located in the control resource pool configuration information and used for the transmission of the control information, and CP length indication information located in the data resource pool configuration information and used for the transmission of the data information.

The time-frequency resource indication information may include, but not limited to, indication information about a D2D transmission subframe and/or indication information about a position of a frequency resource.

Step 502: generating, by the UE, the control information in accordance with the determined resource pool configuration information.

In a possible embodiment of the present disclosure, the UE may acquire predetermined identification information corresponding to the determined resource pool configuration information, the identification information being carried in the control information at a specific bit; or the UE may acquire predetermined identification information corresponding to the determined resource pool configuration information, the identification information being carried in a DMRS sequence adopted for transmitting the control information.

In a possible embodiment of the present disclosure, in the case that the determined resource pool configuration information is derived from the UE within the coverage area of a cell or network, the identification information is an identifier associated with a cell identifier, and in the case that the determined resource pool configuration information is derived from the UE outside the coverage area of the network, the identification information is a predetermined value.

The identifier associated with the cell identifier may be just the cell identifier, or identification information calculated in accordance with the cell identifier using a predetermined rule.

Step 503: transmitting, by the UE, the control information in accordance with the determined resource pool configuration information, and transmitting the data information in accordance with the control information.

In a possible embodiment of the present disclosure, the UE may transmit the control information in accordance with a position of a transmission resource configured in the determined resource pool configuration information, so that a reception UE is capable of implicitly determining the resource pool configuration information, on which the control information is based, in accordance with a position of a transmission resource of the control information.

To be specific, the UE may transmit the control information in accordance with a retransmission mode configured in the determined resource pool configuration information, so that the reception UE is capable of implicitly determining the resource pool configuration information, on which the control information is based, in accordance with a transmission mode of the control information.

The UE may transmit, in accordance with the control information, the data information on a resource occupied by the data information configured in the determined resource pool configuration information.

According to the embodiments of the present disclosure, the UE may determine the resource pool configuration information, generate the control information in accordance with the determined resource pool configuration information, transmit the control information in accordance with the determined resource pool configuration information, and transmit the data information in accordance with the determined resource pool configuration information and the control information. As a result, it is able for the reception UE to determine the resource pool configuration information in accordance with the control information, thereby to receive the data information in accordance with the determined resource pool configuration information.

A data transmission procedure and a data reception procedure for the D2D communication will be described hereinafter in more details in conjunction with the embodiments.

Figure 6:
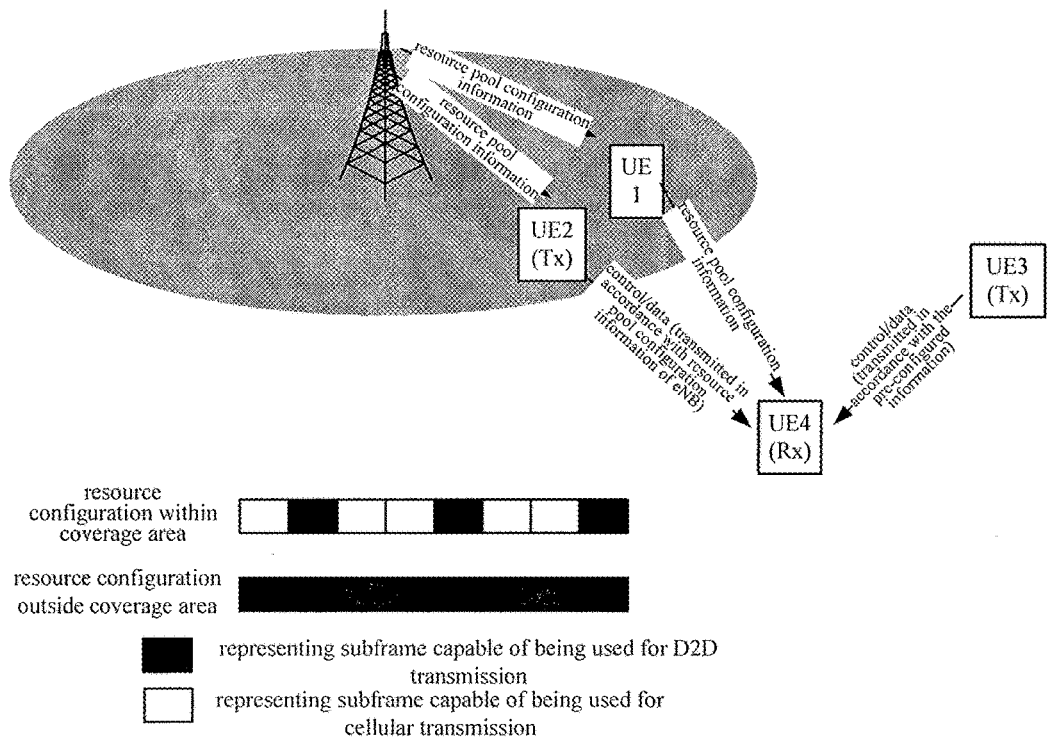
FIG. 6 is a schematic view showing an application scenario where merely some of the UEs are located within the coverage area of a network according to one embodiment of the present disclosure.

In a first embodiment, an application scenario where some of the UEs are located within the coverage area of the network is shown in FIG. 6, and the information about the D2D transmission subframe is configured in the resource pool configuration information. A UE1 within the coverage area of the base station may forward the resource pool configuration information from a base station. A UE2 within the coverage area of the base station may transmit the control information and the data information in accordance with the resource pool configuration information from the base station. A UE3 outside the coverage area of the base station may transmit the control information and the data information in accordance with the pre-configured resource pool configuration information. A UE4 outside the coverage area of the base station may detect the control information in accordance with the resource pool configuration information configured by the base station and the pre-configured resource pool configuration information, and after the control information from the UE2 has been detected, receive the data information from the UE2 in accordance with the detected resource pool configuration information (the resource pool configuration information configured by the base station) indicated in the control information. In addition, the UE4 outside the coverage area of the base station may detect the control information in accordance with the resource pool configuration information configured by the base station and the pre-configured resource pool configuration information, and after the control information from the UE3 has been detected, receive the data information from the UE3 in accordance with the resource pool configuration information (the pre-configured resource pool configuration information) indicated in the detected control information.

In a second embodiment, an application scenario where some of the UEs are located within the coverage area of the network is shown in FIG. 6. Frequency-hopping modes for the UEs within the coverage area of the base station are configured in the resource pool configuration information, and frequency-hopping modes for the UEs outside the coverage area of the base station are predefined in the resource pool configuration information. For the UEs within the coverage area of the base station, a frequency-hopping mode for a Physical Uplink Control Channel (PUCCH) or a frequency-hopping mode for a Physical Uplink Shared Channel (PUSCH) may be used, and at this time, it is necessary to further configure a size of a sub-band.

To be specific, the UE1 within the coverage area of the base station may forward the frequency-hopping configuration information of the base station. The UE2 within the coverage area of the base station may transmit the control information and the data information in accordance with the frequency-hopping configuration information of the base station. The UE3 outside the coverage area of the base station may transmit the control information and the data information in accordance with the pre-configured frequency-hopping configuration information. The UE4 outside the coverage area of the base station may detect the control information in accordance with both the frequency-hopping configuration information of the base station and the pre-configured frequency-hopping configuration information, and after the control information from the UE2 has been detected, receive the data information from the UE2 in accordance with the frequency-hopping configuration information (the frequency-hopping configuration information of the base station) indicated by the control information from the UE2. In addition, the UE4 outside the coverage area of the base station may detect the control information in accordance with both the frequency-hopping configuration information of the base station and the pre-configured frequency-hopping configuration information, and after the control information from the UE3 has been detected, receive the data information from the UE3 in accordance with the frequency-hopping configuration information (the pre-configured frequency-hopping configuration information) indicated by the control information from the UE3.

Figure 7:
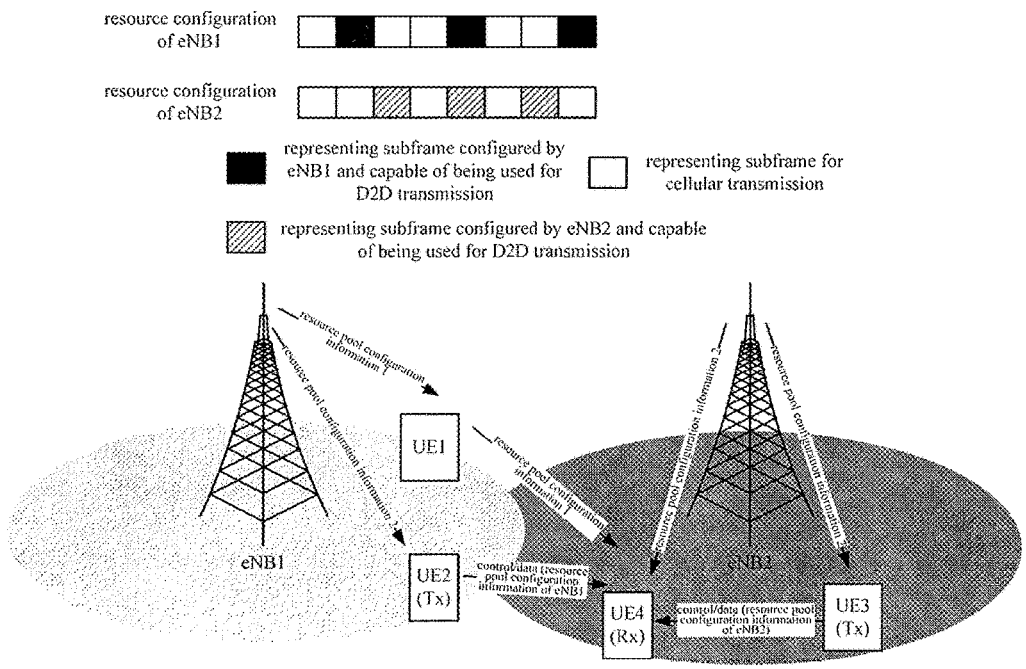
FIG. 7 is a schematic view showing an application scenario where the UEs are located within the coverage areas of different cells according to one embodiment of the present disclosure.

In a third embodiment, an application scenario where the UEs are located within the coverage area of different cells is shown in FIG. 7. The UE1 within the coverage area of a base station, e.g. eNB1 may forward resource pool configuration information 1 from the eNB1. The UE2 within the coverage area of the eNB1 may transmit the control information and the data information in accordance with the resource pool configuration information 1 from the eNB1. The UE3 within the coverage area of another base station, e.g. eNB2 may transmit the control information and the data information in accordance with resource pool configuration information 2 from the eNB2. The UE4 within the coverage area of the eNB2 may acquire the resource pool configuration information 1 forwarded by the UE1 and the resource pool configuration information 2 from the eNB2. The reception of the control information and the data information by the UE4 will be described hereinafter.

The UE4 may detect the control information in accordance with the resource pool configuration information 1 and the resource pool configuration information 2, and in the case that the control information from the UE2 has been detected, receive the data information from the UE2 in accordance with the resource pool configuration information 1 indicated by the control information. In addition, the UE 4 may detect the control information in accordance with the resource pool configuration information 1 and the resource pool configuration information 2, and in the case that the control information from the UE3 has been detected, receive the data information from the UE3 in accordance with the resource pool configuration information 2 indicated by the control information.

Figure 8:
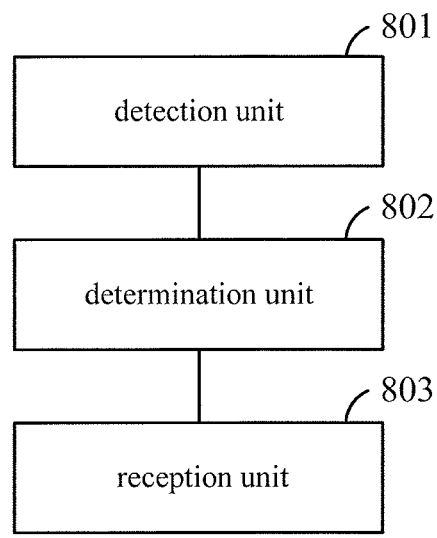
FIG. 8 is a schematic view showing a UE according to one embodiment of the present disclosure.

Based on an identical inventive concept, the present disclosure further provides in some embodiments a UE for D2D communication. The implementation of the UE may refer to that of the reception UE mentioned in the above, and thus will not be repeated herein. As shown in FIG. 8, the UE mainly includes: a detection unit 801 configured to detect control information from a transmitter using each set of locally-stored resource pool configuration information; a determination unit 802 configured to determine resource pool configuration information used by the transmitter in accordance with the detected control information; and a reception unit 803 configured to receive data information from the transmitter in accordance with the determined resource pool configuration information and the detected control information.

In a possible embodiment of the present disclosure, the determination unit 802 is specifically configured to: acquire identification information carried in the control information at a specific bit, and determine resource pool configuration information corresponding to the identification information as the resource pool configuration information used by the transmitter; or acquire identification information carried in a DMRS sequence for transmitting the control information, and determine resource pool configuration information corresponding to the identification information as the resource pool configuration information used by the transmitter.

In a possible embodiment of the present disclosure, in the case that the resource pool configuration information is derived from a UE within the coverage area of a cell or network, the identification information is an identifier associated with a cell identifier, and in the case that the resource pool configuration information is derived from a UE outside the coverage area of the network, the identification information is a predetermined value.

The identifier associated with the cell identifier may be just the cell identifier, or identification information calculated in accordance with the cell identifier using a predetermined rule.

In a possible embodiment of the present disclosure, depending on its sources, the locally-stored resource pool configuration information may include, but not limited to, any one or more of pre-configured resource pool configuration information, resource pool configuration information indicated by a base station, and resource pool configuration information indicated by any other UE.

In a possible embodiment of the present disclosure, the resource pool configuration information may include, but not limited to, time-frequency resource indication information, and/or frequency-hopping indication information, and/or CP length indication information.

In a possible embodiment of the present disclosure, the resource pool configuration information consists of control resource pool configuration information for the control information and data resource pool configuration information for the data information.

In the case that a frequency-hopping mode for the transmission of the control information is different from that for the transmission of the data information, the frequency-hopping indication information may include frequency-hopping indication information for the transmission of the control information and frequency-hopping indication information for the transmission of the data information. The frequency-hopping indication information for the transmission of the control information is located in the control resource pool configuration information, and the frequency-hopping indication information for the transmission of the data information is located in the data resource pool configuration information. In the case that the frequency-hopping mode for the transmission of the control information is identical to that for the transmission of the data information, it is unnecessary to separately indicate the frequency-hopping indication information for the transmission of the control information and the frequency-hopping indication information for the transmission of the data information.

Identically, in the case that the time-frequency resource for the transmission of the control information is different from that for the transmission of the data information, the time-frequency resource indication information may include time-frequency resource indication information located in the control resource pool configuration information and used for the transmission of the control information, and time-frequency resource indication information located in the data resource pool configuration information and used for the transmission of the data information. In the case that a CP length for the transmission of the control information is different from that for the transmission of the data information, the CP length indication information may include CP length indication information located in the control resource pool configuration information and used for the transmission of the control information, and CP length indication information located in the data resource pool configuration information and used for the transmission of the data information.

Figure 9:
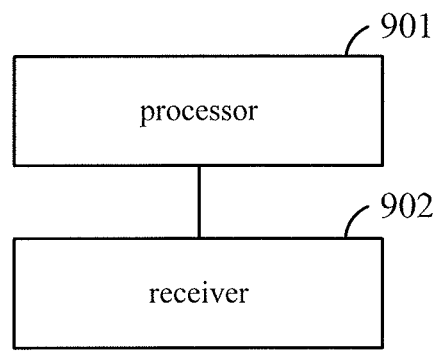
FIG. 9 is another schematic view showing the UE according to one embodiment of the present disclosure.

Based on an identical inventive concept, the present disclosure further provides in some embodiments a UE for D2D communication. The implementation of the UE may refer to that of the reception UE mentioned above, and thus will not be repeated herein. As shown in FIG. 9, the UE mainly includes: a processor 901 configured to detect control information from a transmitter using each set of locally-stored resource pool configuration information and determine resource pool configuration information used by the transmitter in accordance with the detected control information; and a receiver 902 configured to receive data information from the transmitter in accordance with the resource pool configuration information determined by the processor 901 and the control information.

In a possible embodiment of the present disclosure, the processor 901 is specifically configured to: acquire identification information carried in the control information at a specific bit, and determine resource pool configuration information corresponding to the identification information as the resource pool configuration information used by the transmitter; or acquire identification information carried in a DMRS sequence for transmitting the control information, and determine resource pool configuration information corresponding to the identification information as the resource pool configuration information used by the transmitter.

In a possible embodiment of the present disclosure, in the case that the resource pool configuration information is derived from a UE within the coverage area of a cell or network, the identification information is an identifier associated with a cell identifier, and in the case that the resource pool configuration information is derived from a UE outside the coverage area of the network, the identification information is a predetermined value.

The identifier associated with the cell identifier may be just the cell identifier, or identification information calculated in accordance with the cell identifier using a predetermined rule.

In a possible embodiment of the present disclosure, depending on its sources, the locally-stored resource pool configuration information includes any one or more of pre-configured resource pool configuration information, resource pool configuration information indicated by a base station, and resource pool configuration information indicated by any other UE.

In a possible embodiment of the present disclosure, the resource pool configuration information includes time-frequency resource indication information, and/or frequency-hopping indication information, and/or Cyclic Prefix (CP) length indication information.

In a possible embodiment of the present disclosure, the resource pool configuration information consists of control resource pool configuration information for the control information and data resource pool configuration information for the data information.

In the case that a frequency-hopping mode for the transmission of the control information is different from that for the transmission of the data information, the frequency-hopping indication information may include frequency-hopping indication information for the transmission of the control information and frequency-hopping indication information for the transmission of the data information. The frequency-hopping indication information for the transmission of the control information is located in the control resource pool configuration information, and the frequency-hopping indication information for the transmission of the data information is located in the data resource pool configuration information. In the case that the frequency-hopping mode for the transmission of the control information is identical to that for the transmission of the data information, it is unnecessary to separately indicate the frequency-hopping indication information for the transmission of the control information and the frequency-hopping indication information for the transmission of the data information.

Identically, in the case that the time-frequency resource for the transmission of the control information is different from that for the transmission of the data information, the time-frequency resource indication information may include time-frequency resource indication information located in the control resource pool configuration information and used for the transmission of the control information, and time-frequency resource indication information located in the data resource pool configuration information and used for the transmission of the data information. In the case that a CP length for the transmission of the control information is different from that for the transmission of the data information, the CP length indication information may include CP length indication information located in the control resource pool configuration information and used for the transmission of the control information, and CP length indication information located in the data resource pool configuration information and used for the transmission of the data information.

Figure 10:
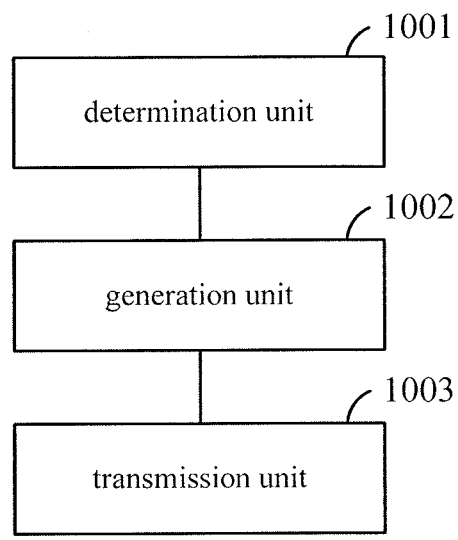
FIG. 10 is yet another schematic view showing the UE according to one embodiment of the present disclosure.

Based on an identical inventive concept, the present disclosure further provides in some embodiments a UE for D2D communication. The implementation of the UE may refer to that of the transmitter mentioned above, and thus will not be repeated herein. As shown in FIG. 10, the UE mainly includes: a determination unit 1001 configured to determine resource pool configuration information from at least one set of resource pool configuration information; a generation unit 1002 configured to generate control information in accordance with the resource pool configuration information determined by the determination unit 1001; and a transmission unit 1003 configured to transmit the control information generated by the generation unit 1002 in accordance with the resource pool configuration information determined by the determination unit 1001, and transmit data information in accordance with the control information.

In a possible embodiment of the present disclosure, depending on its resource, the at least one set of resource pool configuration information includes any one or more of pre-configured resource pool configuration information, resource pool configuration information indicated by a base station, and resource pool configuration information indicated by any other UE.

In a possible embodiment of the present disclosure, the determination unit 1001 is specifically configured to: in the case that a UE is located outside the coverage area of a network, determine the pre-configured resource pool configuration information as the resource pool configuration information; and in the case that the UE is located within the coverage area of the network, determine the resource pool configuration information indicated by the base station as the resource pool configuration information, or determine any one of sets of the resource pool configuration information forwarded by the other UEs as the resource pool configuration information.

In a possible embodiment of the present disclosure, the generation unit 1002 is specifically configured to: acquire predetermined identification information corresponding to the determined resource pool configuration information, the identification information being carried in the control information at a specific bit; or acquire predetermined identification information corresponding to the determined resource pool configuration information, the identification information being carried in a DMRS sequence adopted for transmitting the control information.

In a possible embodiment of the present disclosure, in the case that the determined resource pool configuration information is derived from a UE within the coverage area of a cell or network, the identification information is an identifier associated with a cell identifier, and in the case that the determined resource pool configuration information is derived from a UE outside the coverage area of the network, the identification information is a predetermined value.

The identifier associated with the cell identifier may be just the cell identifier, or identification information calculated in accordance with the cell identifier using a predetermined rule.

In a possible embodiment of the present disclosure, the resource pool configuration information includes time-frequency resource indication information, and/or frequency-hopping indication information, and/or CP length indication information.

In a possible embodiment of the present disclosure, the resource pool configuration information consists of control resource pool configuration information for the control information and data resource pool configuration information for the data information.

In the case that a frequency-hopping mode for the transmission of the control information is different from that for the transmission of the data information, the frequency-hopping indication information may include frequency-hopping indication information for the transmission of the control information and frequency-hopping indication information for the transmission of the data information. The frequency-hopping indication information for the transmission of the control information is located in the control resource pool configuration information, and the frequency-hopping indication information for the transmission of the data information is located in the data resource pool configuration information. In the case that the frequency-hopping mode for the transmission of the control information is identical to that for the transmission of the data information, it is unnecessary to separately indicate the frequency-hopping indication information for the transmission of the control information and the frequency-hopping indication information for the transmission of the data information.

Identically, in the case that the time-frequency resource for the transmission of the control information is different from that for the transmission of the data information, the time-frequency resource indication information may include time-frequency resource indication information located in the control resource pool configuration information and used for the transmission of the control information, and time-frequency resource indication information located in the data resource pool configuration information and used for the transmission of the data information. In the case that a CP length for the transmission of the control information is different from that for the transmission of the data information, the CP length indication information may include CP length indication information located in the control resource pool configuration information and used for the transmission of the control information, and CP length indication information located in the data resource pool configuration information and used for the transmission of the data information.

Figure 11:
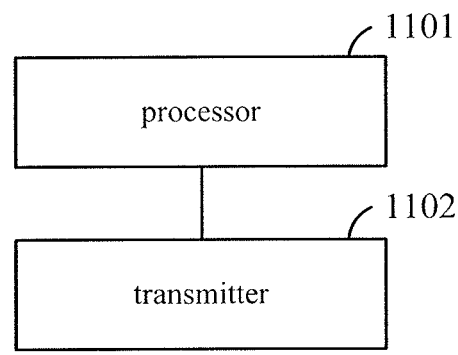
FIG. 11 is still yet another schematic view showing the UE according to one embodiment of the present disclosure.

Based on an identical inventive concept, the present disclosure further provides in some embodiments a UE for D2D communication. The implementation of the UE may refer to that of the transmitter mentioned above, and thus will not be repeated herein. As shown in FIG. 11, the UE mainly includes: a processor 1101 configured to determine resource pool configuration information from at least one set of resource pool configuration information and generate control information in accordance with the determined resource pool configuration information; and a transmitter 1102 configured to transmit the control information in accordance with the determined resource pool configuration information, and transmit data information in accordance with the control information.

In a possible embodiment of the present disclosure, depending on its resource, the at least one set of resource pool configuration information includes any one or more of pre-configured resource pool configuration information, resource pool configuration information indicated by a base station, and resource pool configuration information indicated by any other UE.

In a possible embodiment of the present disclosure, the processor 1101 is specifically configured to: in the case that a UE is located outside the coverage area of a network, determine the pre-configured resource pool configuration information as the resource pool configuration information; and in the case that the UE is located within the coverage area of the network, determine the resource pool configuration information indicated by the base station as the resource pool configuration information, or determine any one of sets of the resource pool configuration information forwarded by the other UEs as the resource pool configuration information.

In a possible embodiment of the present disclosure, the processor is configured to: acquire predetermined identification information corresponding to the determined resource pool configuration information, the identification information being carried in the control information at a specific bit; or acquire predetermined identification information corresponding to the determined resource pool configuration information, the identification information being carried in a DMRS sequence adopted for transmitting the control information.

In a possible embodiment of the present disclosure, in the case that the determined resource pool configuration information is derived from a UE within the coverage area of a cell or network, the identification information is an identifier associated with a cell identifier, and in the case that the determined resource pool configuration information is derived from a UE outside the coverage area of the network, the identification information is a predetermined value.

The identifier associated with the cell identifier may be just the cell identifier, or identification information calculated in accordance with the cell identifier using a predetermined rule.

In a possible embodiment of the present disclosure, the resource pool configuration information includes time-frequency resource indication information, and/or frequency-hopping indication information, and/or CP length indication information.

In a possible embodiment of the present disclosure, the resource pool configuration information consists of control resource pool configuration information for the control information and data resource pool configuration information for the data information.

In the case that a frequency-hopping mode for the transmission of the control information is different from that for the transmission of the data information, the frequency-hopping indication information may include frequency-hopping indication information for the transmission of the control information and frequency-hopping indication information for the transmission of the data information. The frequency-hopping indication information for the transmission of the control information is located in the control resource pool configuration information, and the frequency-hopping indication information for the transmission of the data information is located in the data resource pool configuration information. In the case that the frequency-hopping mode for the transmission of the control information is identical to that for the transmission of the data information, it is unnecessary to separately indicate the frequency-hopping indication information for the transmission of the control information and the frequency-hopping indication information for the transmission of the data information.

Identically, in the case that the time-frequency resource for the transmission of the control information is different from that for the transmission of the data information, the time-frequency resource indication information may include time-frequency resource indication information located in the control resource pool configuration information and used for the transmission of the control information, and time-frequency resource indication information located in the data resource pool configuration information and used for the transmission of the data information. In the case that a CP length for the transmission of the control information is different from that for the transmission of the data information, the CP length indication information may include CP length indication information located in the control resource pool configuration information and used for the transmission of the control information, and CP length indication information located in the data resource pool configuration information and used for the transmission of the data information.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A data reception method for device-to-device (D2D) communication, comprising steps of:
    detecting control information from a transmitter using each set of locally-stored resource pool configuration information;
    determining resource pool configuration information used by the transmitter in accordance with the detected control information; and
    receiving data information from the transmitter in accordance with the determined resource pool configuration information and the control information;
    wherein the step of determining the resource pool configuration information used by the transmitter in accordance with the detected control information comprises:
    acquiring identification information carried in the control information at a specific bit, and determining resource pool configuration information corresponding to the identification information as the resource pool configuration information used by the transmitter; or
    acquiring identification information carried in a Demodulation Reference Signal (DMRS) sequence for transmitting the control information, and determining resource pool configuration information corresponding to the identification information as the resource pool configuration information used by the transmitter; or
    acquiring a position of a transmission resource of the control information, and determining, in accordance with a predetermined correspondence between the position of the transmission resource and resource pool configuration information, resource pool configuration information corresponding to the position of the transmission resource as the resource pool configuration information used by the transmitter;
    wherein the resource pool configuration information comprises at least Cyclic Prefix (CP) length indication information, and the CP length indication information comprises: CP length indication information located in the control resource pool configuration information and used for the transmission of the control information, and CP length indication information located in data resource pool configuration information and used for the transmission of the data information.

2. The data reception method according to claim 1, wherein
    in the case that the resource pool configuration information is derived from a User Equipment (UE) within the coverage area of a cell or a network, the identification information is an identifier associated with a cell identifier; and
    in the case that the resource pool configuration information is derived from a UE outside the coverage area of the network, the identification information is a predetermined value.

3. The data reception method according to claim 1, wherein depending on its sources, the locally-stored resource pool configuration information comprises any one or more of pre-configured resource pool configuration information, resource pool configuration information indicated by a base station, and resource pool configuration information indicated by another UE.

4. The data reception method according to claim 3, wherein the resource pool configuration information further comprises at least one of time-frequency resource indication information, and frequency-hopping indication information.

5. The data reception method according to claim 4, wherein
    the resource pool configuration information consists of control resource pool configuration information for the control information and data resource pool configuration information for the data information;
    the frequency-hopping indication information comprises: frequency-hopping indication information located in the control resource pool configuration information and used for the transmission of the control information, and frequency-hopping indication information located in the data resource pool configuration information and used for the transmission of the data information;
    the time-frequency resource indication information comprises: time-frequency resource indication information located in the control resource pool configuration information and used for the transmission of the control information, and time-frequency resource indication information located in the data resource pool configuration information and used for the transmission of the data information.

6. The data reception method according to claim 2, wherein the identifier associated with the cell identifier is just the cell identifier, or identification information calculated in accordance with the cell identifier using a predetermined rule.

7. A data transmission method for device-to-device (D2D) communication, comprising steps of:
    determining resource pool configuration information from at least one set of resource pool configuration information;

generating control information in accordance with the determined resource pool configuration information; and transmitting the control information in accordance with the determined resource pool configuration information, and transmitting data information in accordance with the control information, wherein the control information is configured to determine, by a User Equipment (UE), the resource pool configuration information from locally-stored resource pool configuration information, the resource pool configuration information determined from locally-stored resource pool configuration information is to be used by transmitting data information;

wherein the step of generating the control information in accordance with the determined resource pool configuration information comprises:

acquiring predetermined identification information corresponding to the determined resource pool configuration information, the identification information being carried in the control information at a specific bit; or acquiring predetermined identification information corresponding to the determined resource pool configuration information, the identification information being carried in a Demodulation Reference Signal (DMRS) sequence adopted for transmitting the control information; or acquiring predetermined correspondence between the position of the transmission resource and resource pool configuration information, the predetermined correspondence corresponding to the determined resource pool configuration information, and the position of the transmission resource being carried in the control information;

wherein the resource pool configuration information comprises at least Cyclic Prefix (CP) length indication information, and the CP length indication information comprises: CP length indication information located in the control resource pool configuration information and used for the transmission of the control information, and CP length indication information located in data resource pool configuration information and used for the transmission of the data information.

8. The data transmission method according to claim 7, wherein depending on its resource, the at least one set of resource pool configuration information comprises any one or more of pre-configured resource pool configuration information, resource pool configuration information indicated by a base station, and resource pool configuration information indicated by another User Equipment (UE).

9. The data transmission method according to claim 8, wherein the step of determining the resource pool configuration information from the at least one set of resource pool configuration information comprises:

in the case that a UE is located outside the coverage area of a network, determining the pre-configured resource pool configuration information as the resource pool configuration information; and in the case that the UE is located within the coverage area of the network, determining the resource pool configuration information indicated by the base station as the resource pool configuration information, or determining any one of sets of resource pool configuration information forwarded by other UEs as the resource pool configuration information.

10. The data transmission method according to claim 7, wherein in the case that the resource pool configuration information is derived from a UE within the coverage area of a cell or network, the identification information is an identifier associated with a cell identifier; and in the case that the resource pool configuration information is derived from a UE outside the coverage area of the network, the identification information is a predetermined value.

11. The data transmission method according to claim 7, wherein the resource pool configuration information further comprises at least one of time-frequency resource indication information, and frequency-hopping indication information.

12. The data transmission method according to claim 11, wherein the resource pool configuration information consists of control resource pool configuration information for the control information and data resource pool configuration information for the data information;

the frequency-hopping indication information comprises: frequency-hopping indication information located in the control resource pool configuration information and used for the transmission of the control information, and frequency-hopping indication information located in the data resource pool configuration information and used for the transmission of the data information;

the time-frequency resource indication information comprises: time-frequency resource indication information located in the control resource pool configuration information and used for the transmission of the control information, and time-frequency resource indication information located in the data resource pool configuration information and used for the transmission of the data information.

13. A User Equipment (UE) for device-to-device (D2D) communication, comprising:

a processor; and a memory connected to the processor via a bus interface and configured to store therein programs and data for the operation of the processor, wherein in the case that the programs and data stored in the memory are called and executed by the processor, the processor is configured to:

detect control information from a transmitter using each set of locally-stored resource pool configuration information;

determine resource pool configuration information used by the transmitter in accordance with the detected control information; and receive data information from the transmitter in accordance with the determined resource pool configuration information and the detected control information;

wherein the processor is further configured to:

acquire identification information carried in the control information at a specific bit, and determine resource pool configuration information corresponding to the identification information as the resource pool configuration information used by the transmitter; or acquire identification information carried in a Demodulation Reference Signal (DMRS) sequence for transmitting the control information, and determine resource pool configuration information corresponding to the identification information as the resource pool configuration information used by the transmitter; or acquire a position of a transmission resource of the control information, and determine, in accordance with a predetermined correspondence between the position of the transmission resource and resource pool configuration information, resource pool configuration information corresponding to the position of the transmission resource as the resource pool configuration information used by the transmitter;

wherein the resource pool configuration information comprises at least Cyclic Prefix (CP) length indication information, and the CP length indication information comprises: CP length indication information located in the control resource pool configuration information and used for the transmission of the control information, and CP length indication information located in data resource pool configuration information and used for the transmission of the data information.

14. The UE according to claim 13, wherein in the case that the resource pool configuration information is derived from a UE within the coverage area of a cell or network, the identification information is an identifier associated with a cell identifier; and in the case that the resource pool configuration information is derived from a UE outside the coverage area of the network, the identification information is a predetermined value.

15. The UE according to claim 13, wherein depending on its sources, the locally-stored resource pool configuration information comprises any one or more of pre-configured resource pool configuration information, resource pool configuration information indicated by a base station, and resource pool configuration information indicated by another UE.

16. The UE according to claim 15, wherein the resource pool configuration information further comprises at least one of time-frequency resource indication information, and frequency-hopping indication information.

17. The UE according to claim 16, wherein the resource pool configuration information consists of control resource pool configuration information for the control information and data resource pool configuration information for the data information;

the frequency-hopping indication information comprises: frequency-hopping indication information located in the control resource pool configuration information and used for the transmission of the control information, and frequency-hopping indication information located in the data resource pool configuration information and used for the transmission of the data information;

the time-frequency resource indication information comprises: time-frequency resource indication information located in the control resource pool configuration information and used for the transmission of the control information, and time-frequency resource indication information located in the data resource pool configuration information and used for the transmission of the data information.

\* \* \* \* \*